United States Patent
Sherrill et al.

(10) Patent No.: US 9,463,541 B2
(45) Date of Patent: Oct. 11, 2016

(54) SELECTIVELY COMPLIANT CLAMP

(71) Applicant: Bell Helicopter Textron Inc., Fort Worth, TX (US)

(72) Inventors: Paul Sherrill, Grapevine, TX (US); Ned Hanisko, Paradise, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 393 days.

(21) Appl. No.: 13/791,208

(22) Filed: Mar. 8, 2013

(65) Prior Publication Data

US 2014/0250675 A1 Sep. 11, 2014

(51) Int. Cl.
*B23Q 3/06* (2006.01)
*B23Q 3/08* (2006.01)

(52) U.S. Cl.
CPC .............. *B23Q 3/065* (2013.01); *B23Q 3/063* (2013.01); *B23Q 3/064* (2013.01); *B23Q 3/082* (2013.01); *B23Q 3/088* (2013.01); *Y10T 29/49998* (2015.01)

(58) Field of Classification Search
CPC .......... B23Q 3/00; B23Q 3/06; B23Q 3/061; B23Q 3/062; B23Q 3/063; B23Q 3/08; B23Q 3/008; B25J 15/0023; B25J 15/12
USPC .............. 294/86.4, 87.2, 87.22, 119.3
See application file for complete search history.

(56) References Cited

U.S. PATENT DOCUMENTS

| | | | |
|---|---|---|---|
| 3,133,715 A * | 5/1964 | Grunfelder | B64C 27/50 244/17.11 |
| 3,253,854 A * | 5/1966 | Hollander, Jr. | 294/119.2 |
| 4,294,424 A * | 10/1981 | Teissier | 248/362 |
| 4,301,982 A * | 11/1981 | Tiemann | B64C 27/50 244/17.11 |
| 4,403,801 A * | 9/1983 | Huff et al. | 294/119.3 |
| 4,561,686 A * | 12/1985 | Atchley | 294/188 |
| 4,818,004 A * | 4/1989 | Oswalt | B66C 1/24 294/67.21 |
| 4,995,146 A * | 2/1991 | Woods | B25B 5/003 269/45 |
| 5,467,525 A * | 11/1995 | Pine et al. | 29/743 |
| 7,207,519 B2 * | 4/2007 | Hoynash | B64C 27/50 244/17.11 |
| 8,548,626 B2 * | 10/2013 | Steltz et al. | 700/245 |
| 8,882,165 B2 * | 11/2014 | Lipson et al. | 294/86.4 |
| 2002/0125282 A1 * | 9/2002 | Laverack | B60R 9/045 224/319 |
| 2006/0033350 A1 * | 2/2006 | Besch | 294/119.3 |
| 2013/0033050 A1 * | 2/2013 | Matsuoka et al. | 294/86.4 |

FOREIGN PATENT DOCUMENTS

| | | |
|---|---|---|
| DE | 102004056142 A1 | 6/2006 |
| DE | 102005057859 A1 | 6/2007 |
| DE | 102010018284 A1 * | 10/2011 |
| EP | 2308636 A1 | 4/2011 |
| GB | 2447278 A | 9/2008 |
| WO | WO 2011135450 A1 * | 11/2011 |

OTHER PUBLICATIONS

Communication from a Counter-Part Application; European Extended Search Report; European Application No. EP 13169027.3; Aug. 8, 2013; 6 pgs.
Foreign Communication From a Counterpart Application, European Application No. 13169027.3, Communication Pursuant to Article 94(3) EPC dated Nov. 20, 2013, 4 pages.

* cited by examiner

*Primary Examiner* — Jacob Cigna
(74) *Attorney, Agent, or Firm* — Fish & Richardson P.C.

(57) ABSTRACT

A clamp has a base and a first selectively compliant component carried by the base, the first selectively compliant component being selectively operable between a substantially compliant state and a substantially rigid state.

29 Claims, 6 Drawing Sheets

SELECTIVELY COMPLIANT CLAMP

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Machining flexible workpieces, such as, but not limited to, composite helicopter rotor components, is complicated by the need to restrain the workpiece with force sufficient to prevent the workpiece from moving, but without deforming the workpiece from a relaxed and/or lowest energy state. In some cases where flexible workpieces are supported and/or spatially restrained by bringing the workpiece into registration with a substantially rigid clamp, such registration and/or abutment may deform the workpiece. Machining a workpiece while deformed from a relaxed state may yield a machined workpiece that fails a tolerance inspection, particularly in parts with tight tolerances, such as aircraft parts. Each substantially rigid clamp comprises a substantially fixed clamping profile and/or clamping shape suitable for clamping only to workpieces with substantially complementary profiles and/or shapes. Accordingly, the ability to machine differently shaped workpieces may require a plurality of clamps configured to specifically complement the variously shaped workpieces.

SUMMARY

In some embodiments of the disclosure, a clamp is disclosed as comprising a base and a first selectively compliant component carried by the base, the first selectively compliant component being selectively operable between a substantially compliant state and a substantially rigid state.

In other embodiments of the disclosure, a workpiece retention system is disclosed as comprising a table, a first selectively compliant clamp connected to the table, and a second selectively compliant clamp connected to the table, wherein each of the first selectively compliant clamp and the second selectively compliant clamp comprise at least one selectively compliant component selectively operable between a substantially compliant state and a substantially rigid state.

In yet other embodiments of the disclosure, a method of restraining a workpiece is disclosed as comprising providing a selectively compliant clamp comprising a selectively compliant component, at least partially enveloping a workpiece with the selectively compliant component, and transitioning the selectively compliant component from a compliant state to a relatively less compliant state.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases, it may be desirable to provide a clamp that is capable of holding a variety of differently shaped workpieces. In some embodiments of the disclosure, a workpiece retention system is disclosed that comprises a selectively compliant clamp that retains a workpiece without substantially deforming the workpiece while the workpiece is being restrained.

Figure 1:
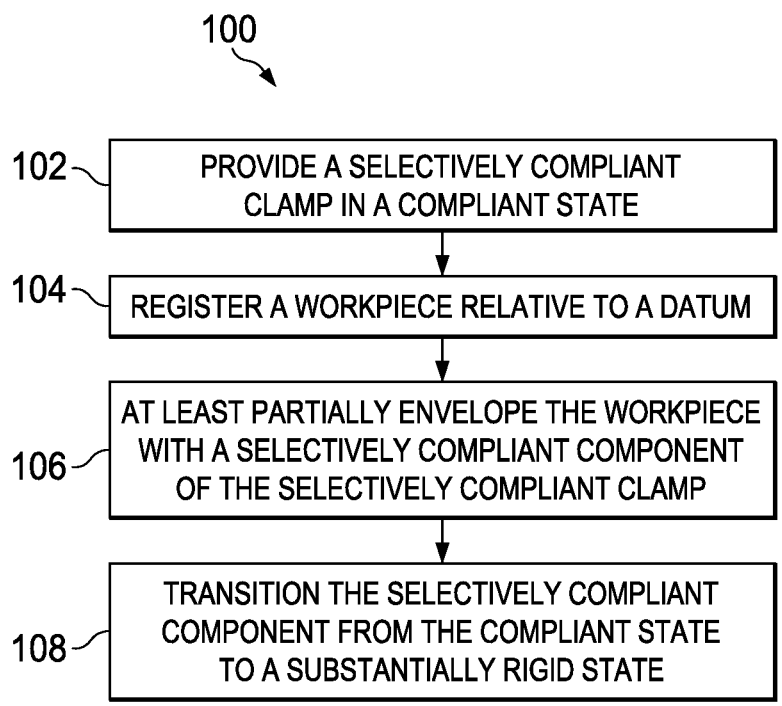
FIG. 1 is a flowchart of a method of restraining a workpiece according to an embodiment of the disclosure.
Figure 2:
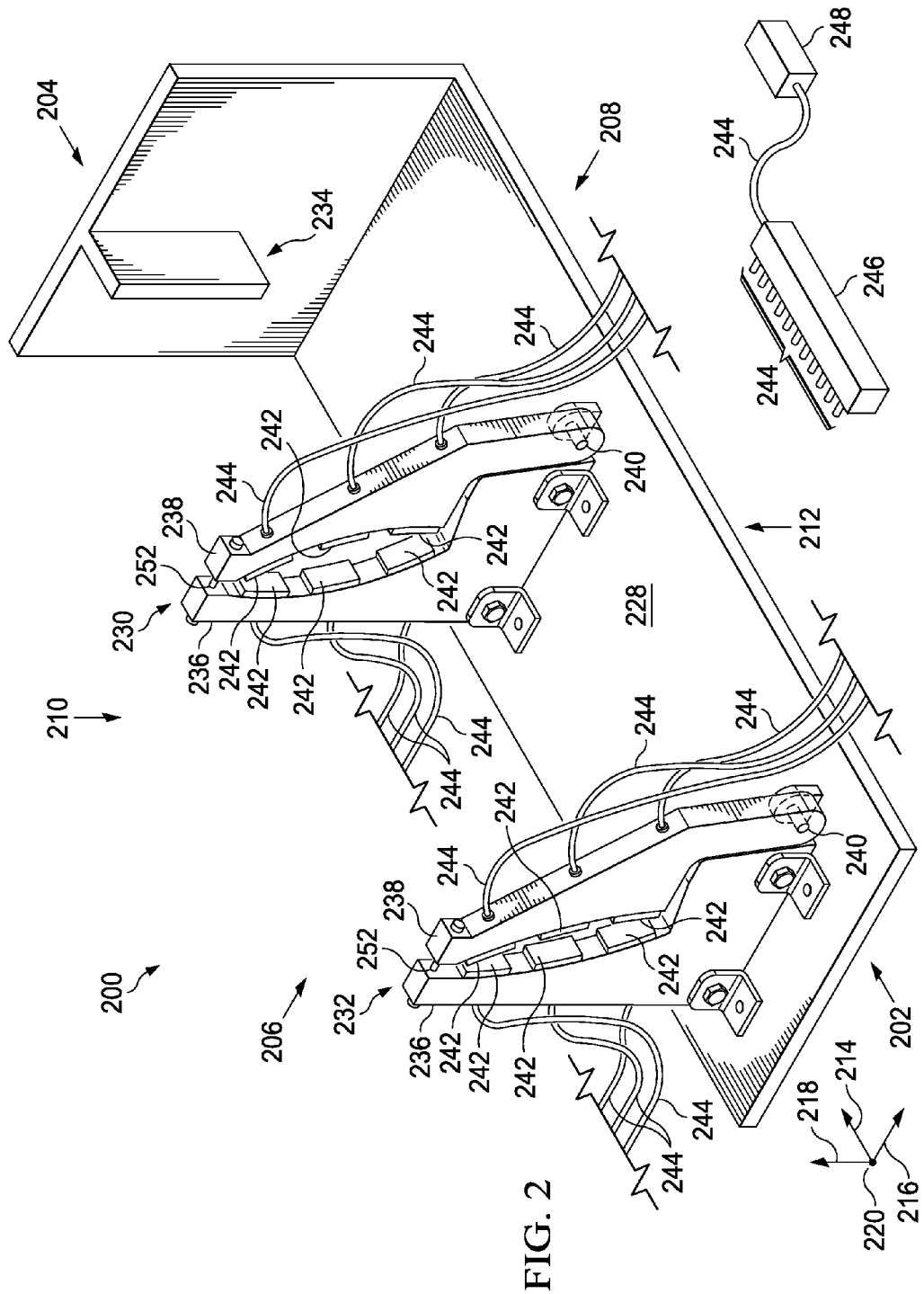
FIG. 2 is an oblique front-top-right view of a workpiece restraining system according to an embodiment of the disclosure.
Figure 3C:
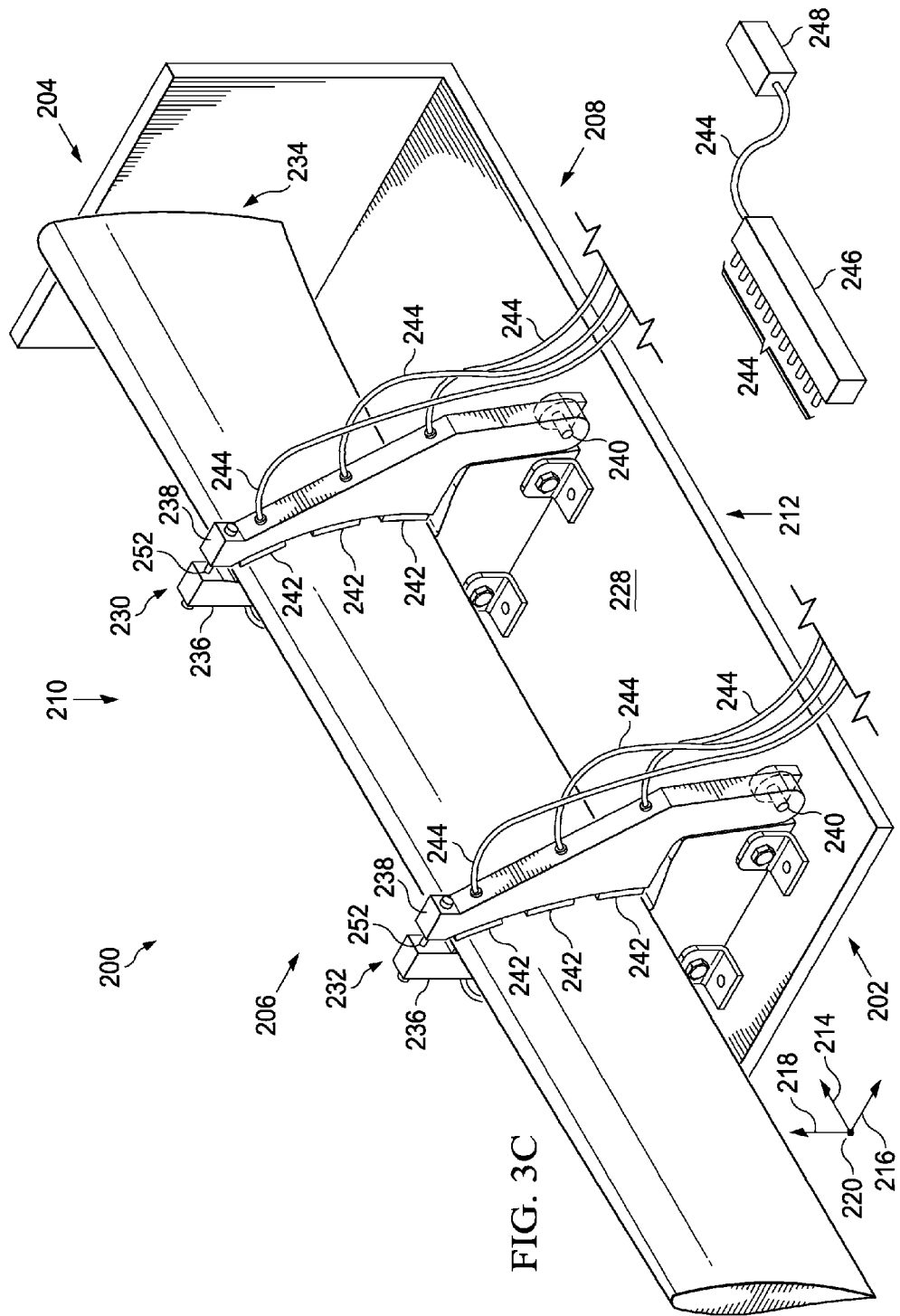
FIG. 3C is an oblique front-top-right view of the workpiece restraining system of FIG. 2 in locked configuration.
Figure 4:
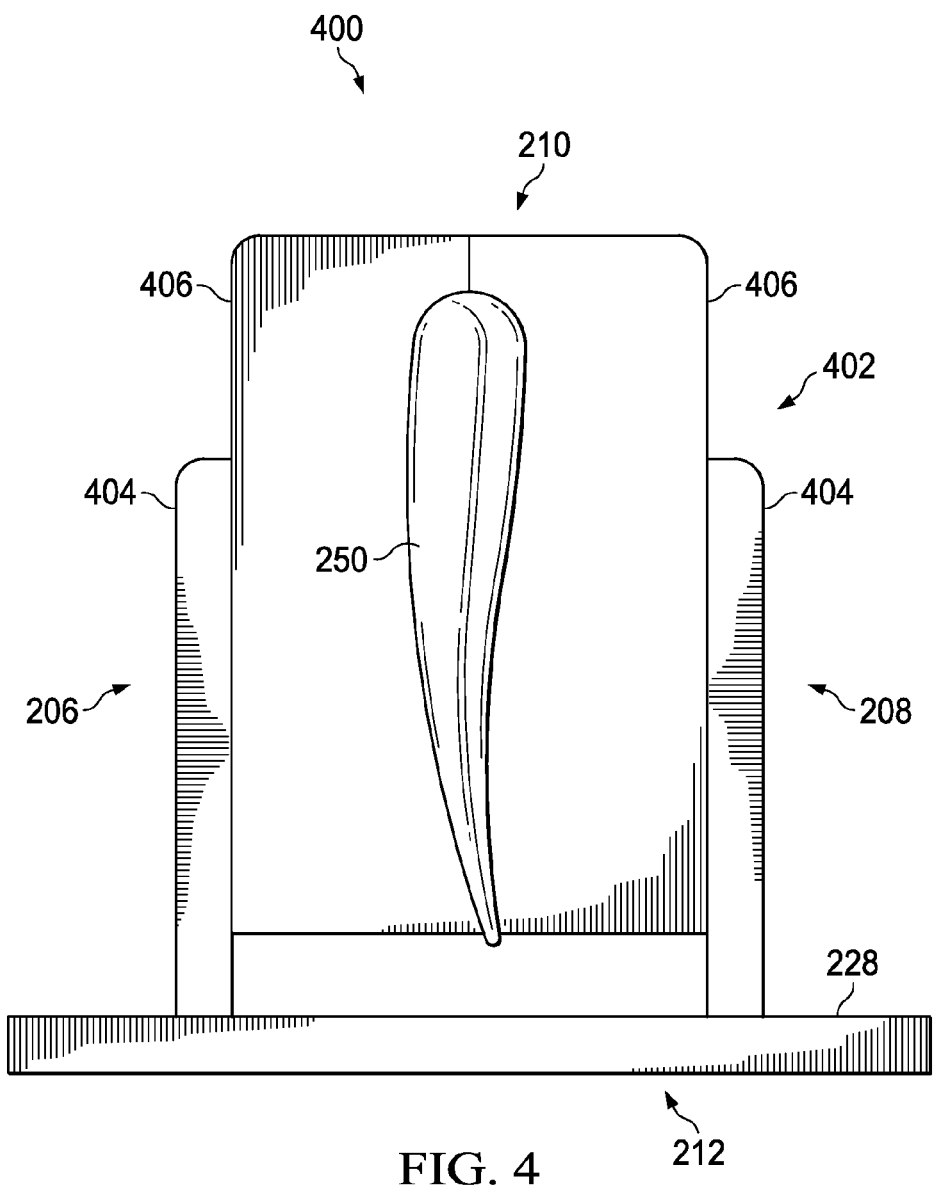
FIG. 4 is an orthogonal front view of a selectively compliant clamp according to another embodiment of the disclosure.

Referring now to FIG. 1, a workpiece retention system (WRS) may be utilized according to a method 100 of restraining a workpiece. In some embodiments, the workpiece may be flexible. The method 100 may begin at block 102 by providing at least one selectively compliant clamp in a compliant state as shown in FIG. 2. The method 100 may continue at block 104 by registering a workpiece relative to at least one datum of the WRS. The method 100 may continue at block 106 by at least partially enveloping the workpiece with a selectively compliant component of the selectively compliant clamp as shown in FIGS. 3C and 4. The method 100 may continue at block 108 by transitioning the selectively compliant clamp from the compliant state to a substantially rigid state as shown in FIGS. 3C and 4. The above-described method 100 may be utilized to generally cause the selectively compliant component of the selectively compliant clamp to selectively reconfigure to comprise a shape that conforms relative to a shape of the workpiece and/or that complements a shape of the workpiece. The above-described transitioning of the selectively compliant component from the compliant state to the substantially rigid state may be accomplished by applying a vacuum pressure to a bladder, altering a supply of electrical energy to a material and/or component that comprises an electrically dependent hardness, and/or any other suitable system of selectively alternating between a relatively pliable component behavior and a relatively rigid component behavior. In some embodiments, the selectively compliant clamp may be used repeatedly in accordance with the method 100 of restraining a workpiece to selectively restrain workpieces comprising a variety of different shapes utilizing the same WRS.

Referring to FIG. 2, an oblique front-top-right view of a workpiece retention system (WRS) 200 according to an embodiment of the disclosure is shown. The WRS 200 may generally comprise a front 202, rear 204, left 206, right 208, top 210, and bottom 212 and the following description and associated drawings may generally utilize directional indications to assist in identifying the directional orientation of the WRS 200 and/or components of the WRS 200 without the requirement that such an indication is an absolute identification of a directional extent of the WRS 200. In other words, the above-described directional indications are intended to generally clarify orientations of the components of the WRS 200 relative to each other and to provide context to the associated figures, not to limit the claims. The same directional indicators are utilized in the discussion and associated figures that comprise the WRS 200, components of the WRS 200, and/or workpieces associated with the WRS 200 to provide a consistent frame of reference throughout the disclosure.

The WRS 200 further comprises a longitudinal axis 214, a lateral axis 216, and a vertical axis 218. The longitudinal axis 214 generally extends longitudinally in a front-rear direction relative to the WRS 200 and in some embodiments may be associated with a longitudinal direction of the WRS 200 and/or a workpiece associated with the WRS 200. The lateral axis 216 generally extends laterally in a left-right direction relative to the WRS 200 and in some embodiments may be associated with a lateral direction of the WRS 200 and/or a workpiece associated with the WRS 200. The vertical axis 218 generally extends vertically in a top-bottom direction relative to the WRS 200. The longitudinal axis 214, lateral axis 216, and vertical axis 218 intersect each other at an origin 220 and may generally be described as defining a three dimensional Cartesian coordinate system. While the axes 214, 216, and 218 are generally defined to reflect a specific location of the origin 220 relative to the WRS 200 and the orientation of the axes 214, 216, and 218 relative to the WRS 200, they may be described differently without impact to the functionality of the WRS 200 and/or the components of the WRS 200 disclosed herein. In other words, unless otherwise noted herein, the defined orientations of the axes 214, 216, and 218 are provided as a frame of reference against which the WRS 200 and the components of the WRS 200 may be consistently described.

Still referring to FIG. 2, the WRS 200 comprises a table 228, a first selectively compliant clamp 230, a second selectively compliant clamp 232, and a datum backstop 234. Each of the first and second selectively compliant clamps 230, 232 may comprise a base 236 that is attached to the table 228 and a jaw 238 that is movably connected to the base 236 via a hinge 240. In some embodiments, the bases 236 may be movably mounted relative to the table 228 through the use of slots formed in the table 228 and/or alternative fastener receptacles. In some embodiments, first and/or second selectively compliant clamps 230, 232 may be rotatable and/or translatable relative to the table 228. In this embodiment, each of the bases 236 and jaws 238 comprise a plurality of selectively compliant components 242. In this embodiment, the selectively compliant components 242 may comprise a bag-like bladder comprising loose aggregate material, such as, but not limited to, spherical beads and/or microbubbles, disposed within the bladder. The selectively compliant components 242 may selectively comprise a compliant state in which the selectively compliant components 242 may be malleable, pliable, deformable, soft, shearable, compressible, stretchable, and/or otherwise geometrically reactive to external forces applied to the exterior of the selectively compliant components 242. The selectively compliant components 242 may selectively comprise a relatively less compliant state and/or a substantially rigid state in which at least one of the above-described malleability, pliability, deformability, softness, shearability, compressibility, stretchiness, and/or geometric reactiveness to external forces applied to the exterior of the selectively compliant components 242 is reduced, lessened, and/or eliminated.

In this embodiment, a selection between the compliant state and the rigid state may comprise selectively applying a vacuum pressure to the interior of the selectively compliant components 242, namely, the interior of the bladders of the selectively compliant components 242. In some cases, the vacuum pressure may evacuate air in the bladders and thereby contract the bladder against the aggregate material to lock the aggregate material into place as a substantially rigid and/or behaviorally unitary component. In some cases, the vacuum pressure may be selectively applied to selected ones of the selectively compliant components 242 via vacuum tubes 244 connected to a selection manifold 246 that is configured to selectively allow and/or disallow fluid communication between selected ones of the selectively compliant components 242 and a vacuum pressure source 248, such as, but not limited to, a vacuum pump.

Figure 3A:
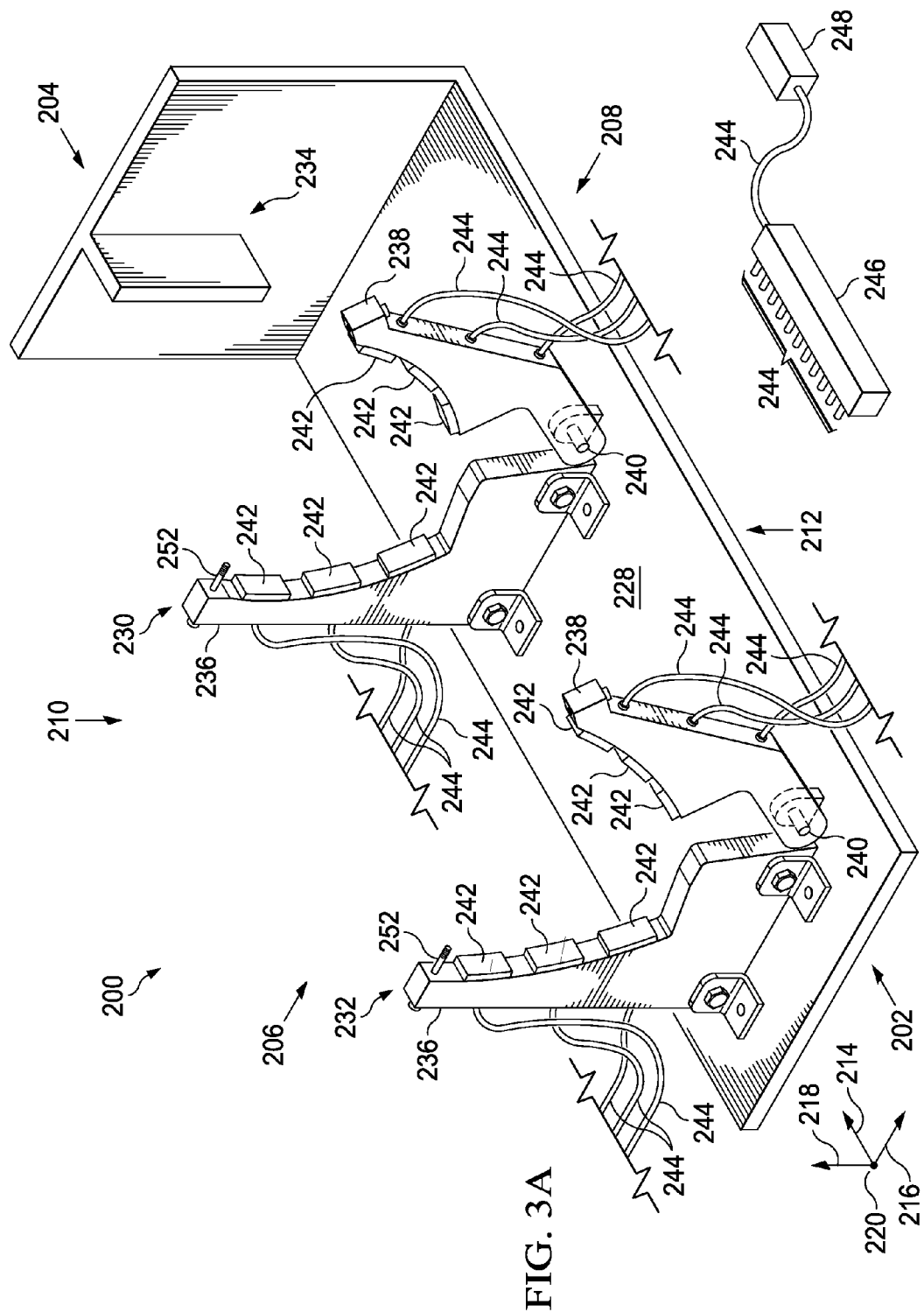
FIG. 3A is an oblique front-top-right view of the workpiece restraining system of FIG. 2 in an open configuration.

Referring now to FIG. 3A, the WRS 200 is shown in an open configuration. In the open configuration, the WRS 200 is provided with the jaws 238 rotated about their respective hinges 240 to move the top of the jaws 238 away from the top of the bases 236. In the open configuration, the selectively compliant components 242 may be provided in a compliant state. In the open configuration, the WRS 200 may receive a workpiece 250 into the first and second selectively compliant clamps 230, 232 from above.

Figure 3B:
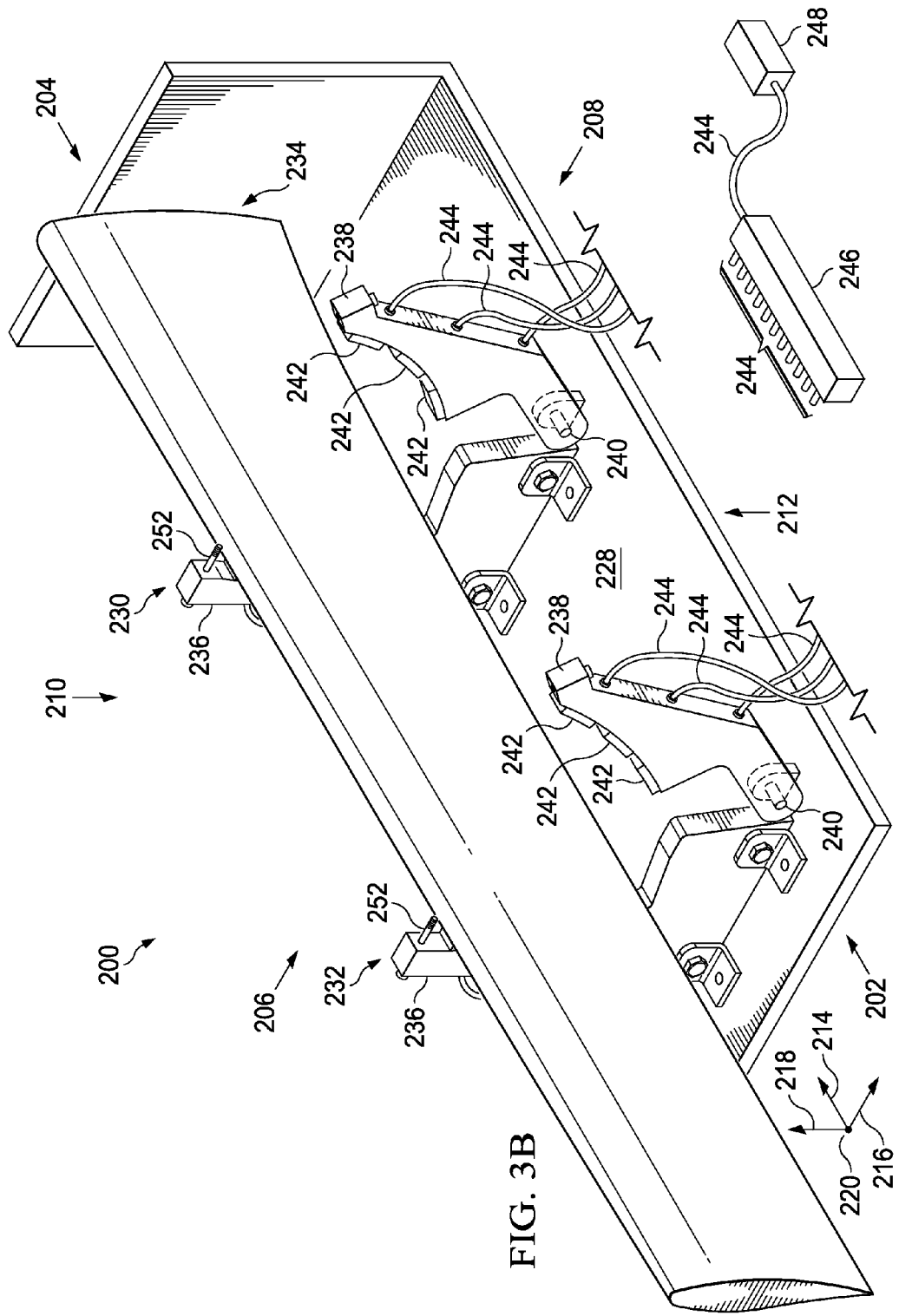
FIG. 3B is an oblique front-top-right view of the workpiece restraining system of FIG. 3A in a closed configuration with a workpiece registered relative to a datum backstop.

Referring now to FIG. 3B, the WRS 200 is shown in an open configuration with a workpiece 250 received within the first and second selectively compliant clamps 230, 232. In some embodiments, the workpiece 250 may be moved rearward and leftward until a flat portion of the workpiece 250 abuts with and/or is otherwise registered and/or spatially maintained in a known location and/or orientation relative to the datum backstop 234 which may comprise both a rearward stop and/or a lateral stop.

Referring now to FIG. 3C, the WRS 200 is shown in a closed configuration in which the WRS 200 is provided with the jaws 238 rotated about their respective hinges 240 to move the top of the jaws 238 closer to the top of the bases 236. In the closed configuration, the selectively compliant components 242 may initially be provided in a compliant state to allow the workpiece 250 to be moved into registration with one or more additional datums until the workpiece 250 is in a predetermined and/or desired position relative to a set of datums. Further, with the tops of the bases 236 and jaws 238 adjacent each other, clamp fasteners 252 may be used to join the top of the bases 236 to their respective associated jaws 238 thereby substantially capturing the workpiece 250 in the WRS 200. When the workpiece 250 is properly registered relative to a set of datums or is otherwise in a desired location and/or orientation, the selectively compliant components 242 of the first and second selectively compliant clamps 230, 232 may be transitioned from the compliant state to the rigid state rendering the WRS 200 in a locked configuration where a spatial orientation and/or location of the workpiece 250 is kept by the first and second selectively compliant clamps 230, 232. In some embodiments, machining of the workpiece 250 may occur when the WRS 200 is in a locked state. After machining and/or other workpiece 250 related tasks are completed, the WRS 200 may be unlocked and returned to the closed configuration by discontinuing the rigid state of the selectively compliant components 242. Similarly, the WRS 200 may further be returned to the open configuration by removing the clamp fasteners 252 and rotating the tops of the jaws 238 away from the tops of the bases 236.

Referring now to FIG. 4, an orthogonal front view of another WRS 400 comprising a selectively compliant clamp 402 according to an alternative embodiment of the disclosure is shown. The selectively compliant clamp 402 generally comprises two opposing bases 404 that carry opposing selectively compliant components 406. In this embodiment, the bases 404 may move toward and away from each other and may be connected to a table 228. In this embodiment, the overall size and/or shape of the selectively compliant components 406 may be so large relative to a workpiece 250 that each base 404 may carry only a single or multiple large selectively compliant components 406. In operation, the bases 404 may be moved away from each other to allow a workpiece 250 to be placed between opposing selectively compliant components 406. With the selectively compliant components 406 in a compliant state, the bases 404 may be moved toward each other until the selectively compliant components 406 substantially envelope the workpiece 250 and the bases 404 may be secured relative to the table 228. When the workpiece is oriented and/or located in a desired and/or predetermined manner, the selectively compliant components 406 may be transitioned to the rigid state in which the selectively compliant components 406 restrain the workpiece 250.

In some cases, the above-described selectively compliant components 242, 406 are different from rubber pads of conventional clamps because the rubber pads are generally utilized for providing a relatively soft interface between a workpiece and a relatively hard clamp portion that is shaped to complement the workpiece. This disclosure contemplates that a selectively compliant clamp may comprise one or more large bladders and/or one or more small bladders. This disclosure provides selectively compliant clamps that may be used for differently shaped workpieces. In some embodiments, a bladder may comprise silicone. In some embodiments, a bladder may comprise a relatively high coefficient of friction. In some cases, a selectively compliant clamp may comprise selectively compliant components that are transitioned between a substantially compliant state and a substantially rigid state in response to changes in temperature of the selectively compliant components. In some embodiments, the above-described workpieces may comprise an aircraft component, such as a rotor blade. In some embodiments, a selectively compliant component may comprise piezoelectric components and/or materials configured to provide the above-described substantially compliant state and/or the substantially rigid state in response to changes in electricity applied to the piezoelectric components. In some embodiments, the substantially compliant state of a selectively compliant clamp and/or selectively compliant component may be defined as being flexible and able to deform to a shape of a workpiece without substantially deforming the workpiece.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A clamp to retain an aircraft component, the clamp comprising:

a base comprising a curved portion shaped to complement a curvature of the aircraft component, the base being attached to a table;

a datum backstop attached to the table and positioned longitudinally rearward of the base, wherein the base is registered relative to a datum on the datum backstop, the datum backstop configured to abut a rearward end portion of the aircraft component; and a first selectively compliant component carried by the base, the first selectively compliant component being selectively operable between a substantially compliant state and a substantially rigid state;

wherein when the selectively compliant component is operated in the substantially compliant state, the selectively compliant component is configured to selectively assume a first profile in response to forces being applied to an exterior surface of the selectively compliant component while the selectively compliant component selectively opposes the forces being applied to the exterior surface of the selectively compliant component with reactionary forces;

wherein when the selectively compliant component is operated in the substantially rigid state, the selectively compliant component is configured to selectively maintain the first profile;

wherein the selectively compliant component is configured to selectively return to the substantially compliant state; and wherein the selectively compliant component is configured to transition between the substantially compliant state and the substantially rigid state without substantially altering the reactionary forces.

2. The clamp of claim 1, wherein the first selectively compliant component is configured to transition between the substantially compliant state and the substantially rigid state in response to an electrical supply supplied to the first selectively compliant component.

3. The clamp of claim 1, wherein the selectively compliant component carried by the base substantially envelops a side profile of the aircraft component.

4. The clamp of claim 1, wherein the aircraft component comprises a rotor blade, and wherein the curved portion of the base is shaped to complement the curvature of the rotor blade.

5. The clamp of claim 1, wherein the selectively compliant component is a first selectively compliant component, and wherein the clamp further comprises a plurality of selectively compliant components carried by the base and including the first selectively compliant component, the plurality of selectively compliant components being selectively operable between a substantially compliant state and a substantially rigid state.

6. The clamp of claim 5, wherein the at least one selectively compliant component of the plurality of selectively compliant components is shaped differently from another selectively compliant component of the plurality of selectively compliant components.

7. The clamp of claim 1, further comprising:
a jaw configured to rotate about a hinge between an open configuration to receive the aircraft component and a closed configuration to retain the aircraft component between the base and the jaw; and the hinge rotatably connecting the jaw to the base at a first end of the jaw.

8. The clamp of claim 7, further comprising a second selectively compliant component carried by the jaw, the second selectively compliant component being selectively operable between a substantially compliant state and a substantially rigid state.

9. The clamp of claim 7, further comprising a fastener connected to each of the base and the jaw at a second end of the jaw opposite the hinge, the fastener configured to selectively connect the jaw to the base at the second end of the jaw opposite the hinge, wherein when the fastener rigidly connects the jaw to the base at the second end of the jaw, the fastener at least partially restrains the jaw from moving relative to the base and the aircraft component is at least partially captured between the base and the jaw.

10. The clamp of claim 1, wherein the first selectively compliant component comprises a bladder.

11. The clamp of claim 10, wherein the selectively compliant component comprises an aggregate material disposed within the bladder.

12. The clamp of claim 11, wherein the aggregate material comprises spherical beads.

13. The clamp of claim 12, further comprising a vacuum hose connected to the bladder.

14. A workpiece retention system to retain an aircraft component, comprising:
a table;
a first selectively compliant clamp connected to the table and comprising a first curved portion shaped to complement a curvature of the aircraft component;
a second selectively compliant clamp connected to the table and comprising a second curved portion shaped to complement the curvature of the aircraft component; and
a datum backstop connected to the table and positioned longitudinally rearward the first selectively compliant clamp and the second selectively compliant clamp, wherein at least one of the first selectively compliant clamp or the second selectively compliant clamp are registered relative to a datum on the datum backstop, the datum backstop configured to abut a rearward end portion of the aircraft component;
wherein at least one of the first selectively compliant clamp and the second selectively compliant clamp comprise a selectively compliant component selectively operable between a substantially compliant state and a substantially rigid state;
wherein when the selectively compliant component is operated in the substantially compliant state, the selectively compliant component is configured to selectively assume a first profile in response to forces being applied to an exterior surface of the selectively compliant component while the selectively compliant component selectively opposes the forces being applied to the exterior surface of the selectively compliant component with reactionary forces;
wherein when the selectively compliant component is operated in the substantially rigid state, the selectively compliant component is configured to selectively maintain the first profile;
wherein the selectively compliant component is configured to selectively return to the substantially compliant state; and
wherein the selectively compliant component is configured to transition between the substantially compliant state and the substantially rigid state without substantially altering the reactionary forces.

15. The workpiece retention system of claim 14, wherein the selectively compliant component is configured to transition between the substantially compliant state and the substantially rigid state in response to an electrical supply.

16. The workpiece retention system of claim 14, wherein at least one of the first selectively compliant clamp and the second selectively compliant clamp comprise a bladder comprising spherical beads disposed within the bladder.

17. The workpiece retention system of claim 14, wherein at least one of the first selectively compliant clamp and the second selectively compliant clamp comprise a pair of opposing selectively compliant components.

18. The workpiece retention system of claim 14, wherein the first selectively compliant clamp comprises:
a first base, the first base comprising the first curved portion;
a first jaw configured to rotate about a first hinge between an open configuration to receive the aircraft component and a closed configuration to retain the aircraft component between the first base and the first jaw; and
the first hinge rotatably connecting the first jaw to the first base at a first end of the first jaw; and
wherein the second selectively compliant clamp comprises:
a second base, the second base comprising the second curved portion;
a second jaw configured to rotate about a second hinge between an open configuration to receive the aircraft component and a closed configuration to retain the aircraft component between the first base and the first jaw; and the second hinge rotatably connecting the second jaw to the second base at a first end of the second jaw.

19. The workpiece retention system of claim 14, further comprising a vacuum source selectively connected to the selectively compliant component.

20. The workpiece retention system of claim 19, wherein at least one of the first selectively compliant clamp and the second selectively compliant clamp are configured to receive the aircraft component, the aircraft component comprising a flexible component of a helicopter rotor system.

21. A method of restraining an aircraft component, comprising:
providing a selectively compliant clamp comprising:
a base comprising a curved portion shaped to complement a curvature of the aircraft component, the base being attached to a table;
a jaw;
a hinge rotatably connecting the jaw to the base at a first end of the jaw, wherein the jaw is configured to rotate about the hinge between an open configuration and a closed configuration;
a datum backstop attached to the table and positioned longitudinally rearward of the base; and
a selectively compliant component carried by the base, the selectively compliant component being selectively operable between a substantially compliant state and a substantially rigid state;
registering the base relative to a datum on the datum backstop;
abutting a rearward end portion of the aircraft component against the datum backstop;
at least partially enveloping the aircraft component with the selectively compliant component between the base and the jaw; and
without substantially altering forces applied to the aircraft component from the selectively compliant component, transitioning the selectively compliant component from a compliant state to a relatively less compliant state;
wherein when the selectively compliant component is operated in the compliant state, the selectively compliant component is configured to selectively assume a first profile in response to force being applied to an exterior surface of the selectively compliant component by the aircraft component;

wherein when the selectively compliant component is operated in the relatively less compliant state, the selectively compliant component is configured to selectively maintain the first profile; and
wherein the selectively compliant component is configured to selectively return to the compliant state.

22. The method of claim 21, wherein enveloping the aircraft component comprises pressing the selectively compliant component against the aircraft component to deform the selectively compliant component without substantially deforming the aircraft component.

23. The method of claim 21, wherein the selectively compliant component comprises a bladder containing a plurality of spheres and is configured to interface with the aircraft component, and wherein the transitioning the selectively compliant component from the compliant state to the relatively less compliant state comprises altering a pressure within the bladder.

24. The method of claim 21, wherein the transitioning the selectively compliant component from the compliant state to the relatively less compliant state comprises altering an electrical supply to the selectively compliant component.

25. The method of claim 21, further comprising, with the jaw in the closed configuration, rigidly fastening the base of the selectively compliant clamp to the jaw of the selectively compliant clamp with a fastener connected to the base and the jaw at a second, opposite end of the jaw, wherein the jaw is pivotally attached to the base at the hinge at the first end of the jaw.

26. The method of claim 21, further comprising machining the aircraft component.

27. The method of claim 21, wherein the relatively less compliant state comprises a substantially rigid state.

28. The method of claim 21, wherein the aircraft component comprises a rotor blade.

29. The method of claim 21, wherein at least partially enveloping the aircraft component with the selectively compliant component between the base and the jaw comprises:
with the jaw in the open configuration, placing the aircraft component between the base and the jaw of the selectively compliant clamp; and
rotating the jaw about the hinge to the closed configuration to retain the aircraft component between the base and the jaw of the selectively compliant clamp.

\* \* \* \* \*